(12) United States Patent
Sharma et al.

(10) Patent No.: US 7,757,020 B2
(45) Date of Patent: Jul. 13, 2010

(54) POINT-TO-POINT LINK NEGOTIATION METHOD AND APPARATUS

(75) Inventors: Debendra Das Sharma, Santa Clara, CA (US); Ajay V. Bhatt, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1314 days.

(21) Appl. No.: 11/169,527

(22) Filed: Jun. 29, 2005

(65) Prior Publication Data

US 2007/0008898 A1    Jan. 11, 2007

(51) Int. Cl.
G06F 3/00    (2006.01)
G06F 5/00    (2006.01)

(52) U.S. Cl. ............................. 710/60; 370/252; 714/15
(58) Field of Classification Search ................... 710/10, 710/62, 60; 713/320; 370/252
See application file for complete search history.

(56) References Cited

U.S. PATENT DOCUMENTS

| 5,124,943 | A | | 6/1992 | Lubarsky | |
|---|---|---|---|---|---|
| 5,878,028 | A | * | 3/1999 | Roy et al. | 370/235 |
| 6,675,243 | B1 | * | 1/2004 | Bastiani et al. | 710/105 |
| 6,732,190 | B1 | * | 5/2004 | Williams et al. | 709/250 |
| 6,791,942 | B2 | * | 9/2004 | Jin | 370/229 |
| 7,136,953 | B1 | * | 11/2006 | Bisson et al. | 710/307 |
| 2002/0103945 | A1 | * | 8/2002 | Owen et al. | 710/10 |
| 2002/0133631 | A1 | * | 9/2002 | Yun | 709/251 |
| 2002/0146043 | A1 | * | 10/2002 | Mcrobert et al. | 370/537 |
| 2004/0117674 | A1 | * | 6/2004 | Gutman et al. | 713/300 |

FOREIGN PATENT DOCUMENTS

| EP | 1276297 A2 | 1/2003 |
|---|---|---|
| EP | 1598744 A1 | 11/2005 |

OTHER PUBLICATIONS

Sharma, Debendra D., et al., "PCI Express Advanced Protocol Topics", *PCI Express Developer's Conference* Jun. 6-7, 2005, 27 pages.
"PCT Search Report", *PCT Search Report and Written Opinion*. PCT Application No. PCT/US2006/025951, 1-13 Pgs.

* cited by examiner

*Primary Examiner*—Henry W. H. Tsai
*Assistant Examiner*—Elias Mamo
(74) *Attorney, Agent, or Firm*—Dana B. LeMoine; LeMoine Patent Services, PLLC

(57) ABSTRACT

Point-to-point links between devices are brought up at a slowest available speed, and a faster link speed is negotiated after reaching an operational state.

18 Claims, 5 Drawing Sheets

POINT-TO-POINT LINK NEGOTIATION METHOD AND APPARATUS

FIELD

The present invention relates generally to point-to-point links, and more specifically negotiations between agents in point-to-point links.

BACKGROUND

Links-based systems use point-to-point links to communicate between devices. Links-based systems typically go through an elaborate training process to recognize capabilities of devices on both ends of the link. As devices get faster and have more capabilities, the link training process gets more complicated.

DESCRIPTION OF EMBODIMENTS

Figure 1:
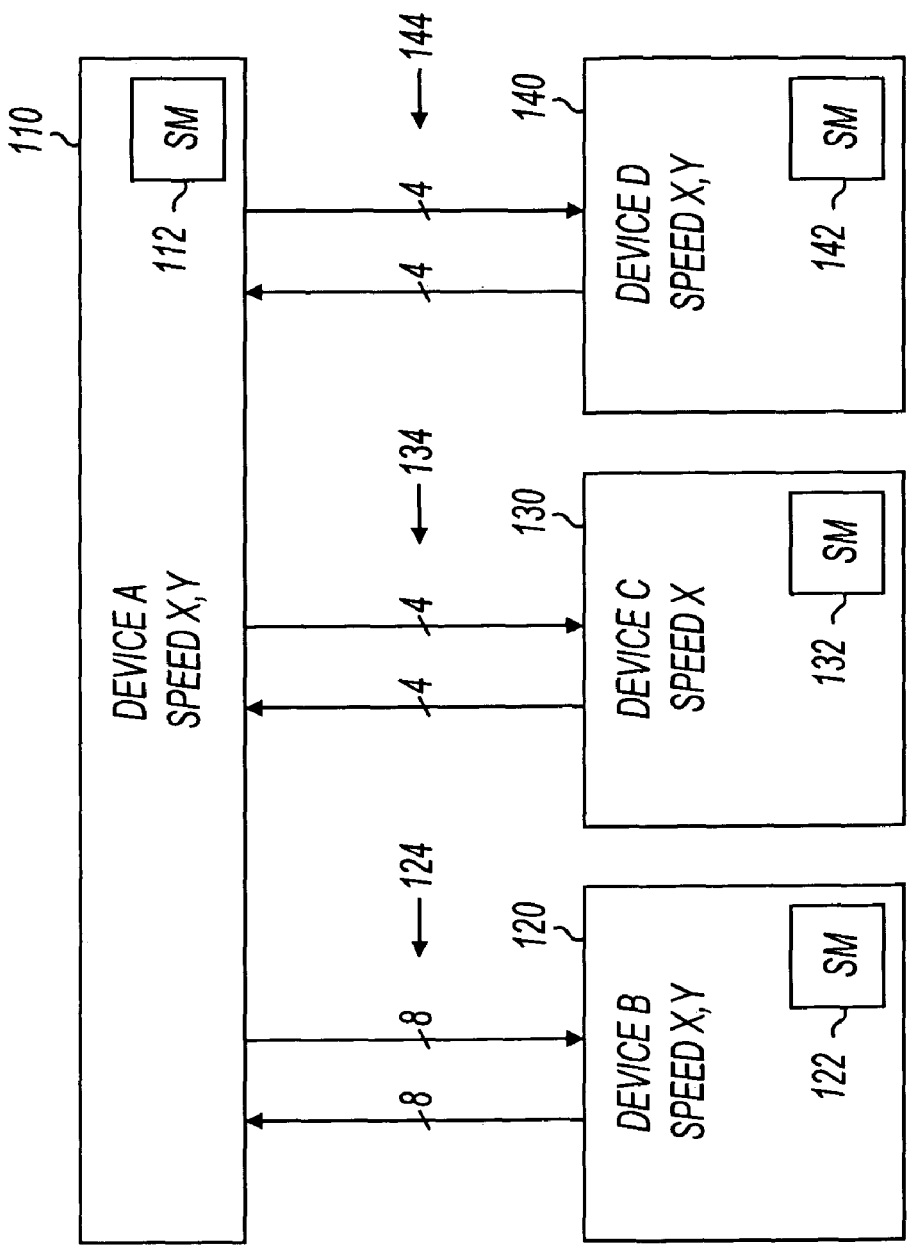
FIG. 1 shows a diagram of multiple devices coupled by point-to-point links.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of multiple devices coupled by point-to-point links. Device 110, also referred to as Device A, is shown communicating with devices 120 (Device B), 130 (Device C), and 140 (Device D) on point-to-point links. For example Device A is shown communicating with Device B using point-to-point link 124, Device A is shown communicating with Device C using point-to-point link 134, and Device A is shown communicating with Device D using point-to-point link 144.

In some embodiments, the devices shown in FIG. 1 and the point-to-point links connecting them operate in compliance or in partial compliance with an interconnect standard such as a peripheral component interconnect (PCI) Express standard, although this is not a limitation of the present invention. For example, various embodiments of the present invention operate point-to-point links in compliance or in partial compliance with Infiniband and CSI. As used herein, the term "PCI" refers to any past, present, or future PCI standard, or extension thereto, including, but not limited to, PCI Express.

Devices 110, 120, 130, and 140 may be any type of device capable of operating as an agent on a point-to-point link. For example, the devices may be integrated circuits, circuit cards that include integrated circuits, or modules that may include multiple circuit cards. Further, each of devices 110, 120, 130, or 140 may include a hierarchy of devices.

Point-to-point links between the various devices can be any width. For example, links 124 are shown having a width of eight "lanes", and links 134 and 144 are each shown having a width of four lanes. Each lane includes a transmit/receive pair, and signals may be single ended or differential.

Devices may have different link speed capabilities. For example, older devices or devices from a previous generation may have slower link speed capabilities than newer devices or devices from a more recent generation. Devices in FIG. 1 are shown having one or two link speed capabilities, represented as speed X and speed Y, where X is slower than Y. For example, Devices A, B, and D have link speed capabilities of both X and Y, whereas Device C only has a link speed capability of X.

In various embodiments of the present invention, the speed of point-to-point links is negotiated between devices after the devices have reached an operational state operating at the slowest available speed. For example, when commencing operation, Devices A, B, C, and D may advertise their link speed capabilities to each other, and then form links operating at the slowest available speed. In this example, links 124, 134, and 144 all reach an operational state operating at speed X. After reaching an operational state at speed X, the devices may negotiate with each other to operate at a different speed. In addition to negotiating the speed of point-to-point links, the width of the links may also be negotiated after reaching an operational state. For example, the width of link 124 may be reduced from eight lanes to four lanes or less through negotiation.

Each of devices 110, 120, 130, and 140 include state machines (SM) that provide the link negotiation capability described above. For example device 110 includes state machine 112, device 120 includes state machine 122, device 130 includes state machine 132, and device 140 includes state machine 142. The various state machines shown in FIG. 1 may negotiate with state machines in other devices, and may also provide configuration for circuits within the device in which it is located. For example, state machine 112 may negotiate with state machine 142 within device 140, and may also configure circuits within device 110 that communicate on link 144.

In some embodiments, each device may include multiple state machines. For example, state machine 112 may include three separate state machines, one to negotiate with each of state machines 122, 132, and 142. Further, in some embodiments, state machine operation may be influenced by either hardware or software. For example, hardware within device 110 may direct state machine 112 to negotiate a lower link speed to increase reliability. Also for example, software being executed by device 110, or software being executed elsewhere may direct state machine 112 to negotiate a lower link speed or a reduction in link width to save power.

Figure 2:
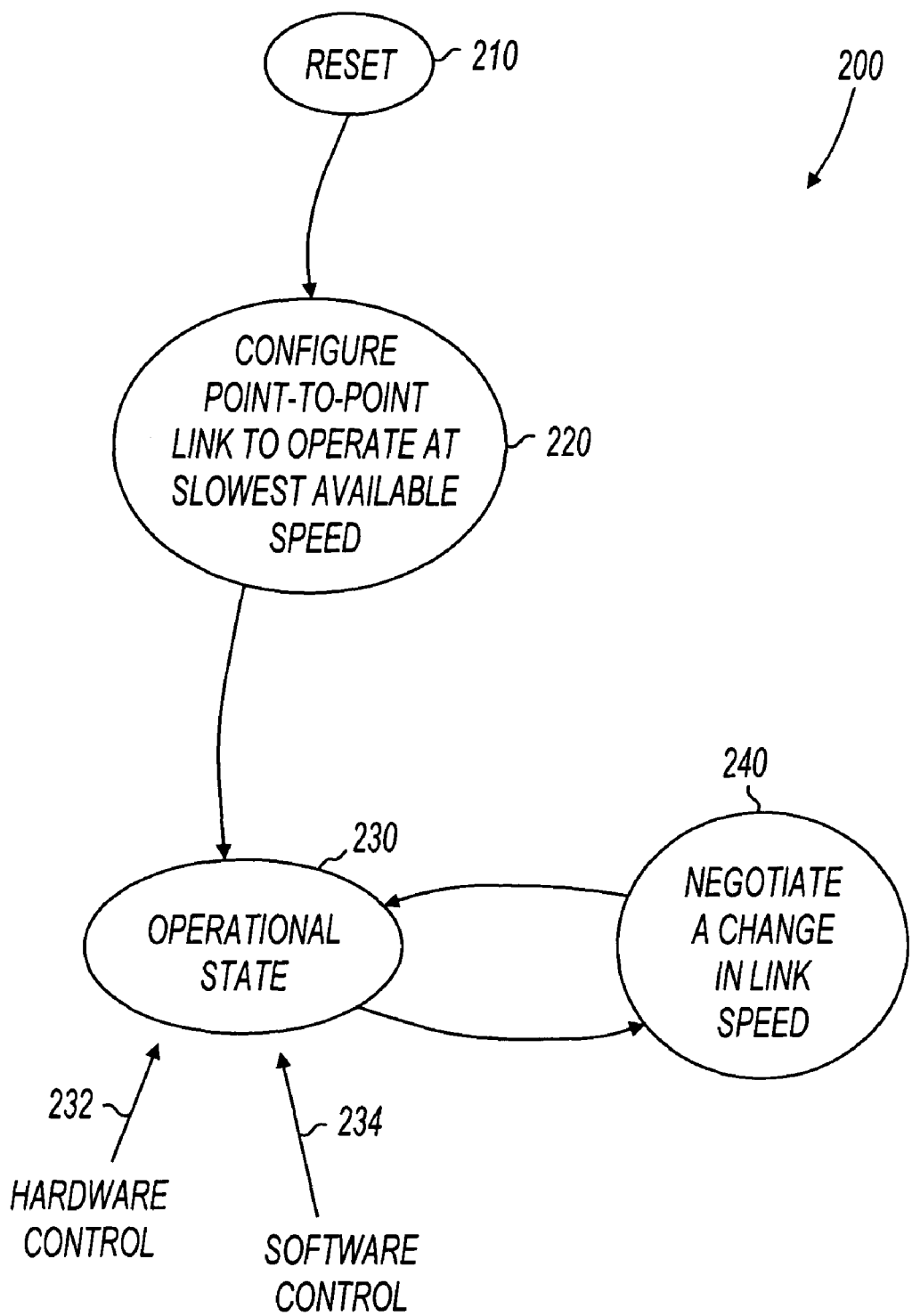
FIGS. 2 and 3 show state machine diagrams describing the operation of point-to-point link state machines.

FIG. 2 shows a state machine diagram describing the operation of a point-to-point link state machine. In some embodiments of the present invention, one or more of state machines 112, 122, 132, and 142 (FIG. 1) may operate in accordance with that shown in state machine diagram 200.

State 210 is a reset state. The reset state may be reached after an interruption in power or after hardware or software reset has occurred. When leaving the reset state, state machine 210 has little or no information regarding whether other devices are coupled to the link interconnect. For example, when leaving the reset state, state machine 200 does not know whether (or how many) devices exist on the interconnect, what their speed capabilities are, or the width of their links.

Upon leaving the reset state, state machine 200 transitions to state 220 where point-to-point links are configured at a slowest possible link speed. For example, referring now back to FIG. 1, state machine 112 configures Device A to communicate on point-to-point link 144 at speed X, even though both Devices A and D are capable of communicating at speed Y. During state 220, state machine 200 advertises the speed capabilities of the local device and records the speed capabilities of other devices coupled to the link interconnect. During state 220, state machine 200 may also detect the presence of other devices, determine link widths, assign identifiers to the various links, and hand off control of multiple links to other state machines.

After the point-to-point link is configured to operate at the slowest available speed, state machine 200 transitions to operational state 230. Operational state 230 is a state in which normal communications may take place over the point-to-point links. For example, normal communications in the operational state may include communicating graphics data, memory data, or any other data.

Operational state 230 may receive control information from hardware or software. For example, as shown at 232, operational state 230 may be influenced by hardware control, and as shown at 234, operational state 230 may be influenced by software control. In some embodiments, software control may be effected through registers. For example, state machine 200 may be responsive to digital information held in registers that are accessible to software. State machine 200 may include a register set that allows software control of link speed, link width, and other attributes of the point-to-point links.

Hardware control may influence the operation of state machine 200 under various scenarios. For example, after first reaching operational state 230, state machine 220 may, under hardware control, immediately negotiate operation at a higher link speed. This may occur if state machine 200 is in a device with higher link speed capability and is communicating with a device also having higher link speed capability. Also for example, if the link is suffering errors, state machine 200, under hardware control, may negotiate a slower link speed in an attempt to improve link performance.

Under either hardware or software control, state machine 200 may negotiate a change in link speed in state 240. State 240 is entered from operational state 230 and returns to operational state 230. By negotiating a change in link speed in this manner, state machine 200 does not pass through the reset state 210 or the configure state 220 in order to modify the link speed. In so doing, a change in link speed may be negotiated without dropping the link.

Link speed may be increased or decreased in state 240. For example, link speed may be increased to improve performance, or link speed may be decreased to reduce power consumption. In some embodiments, link width can also be negotiated up or down in state 240.

Figure 3:
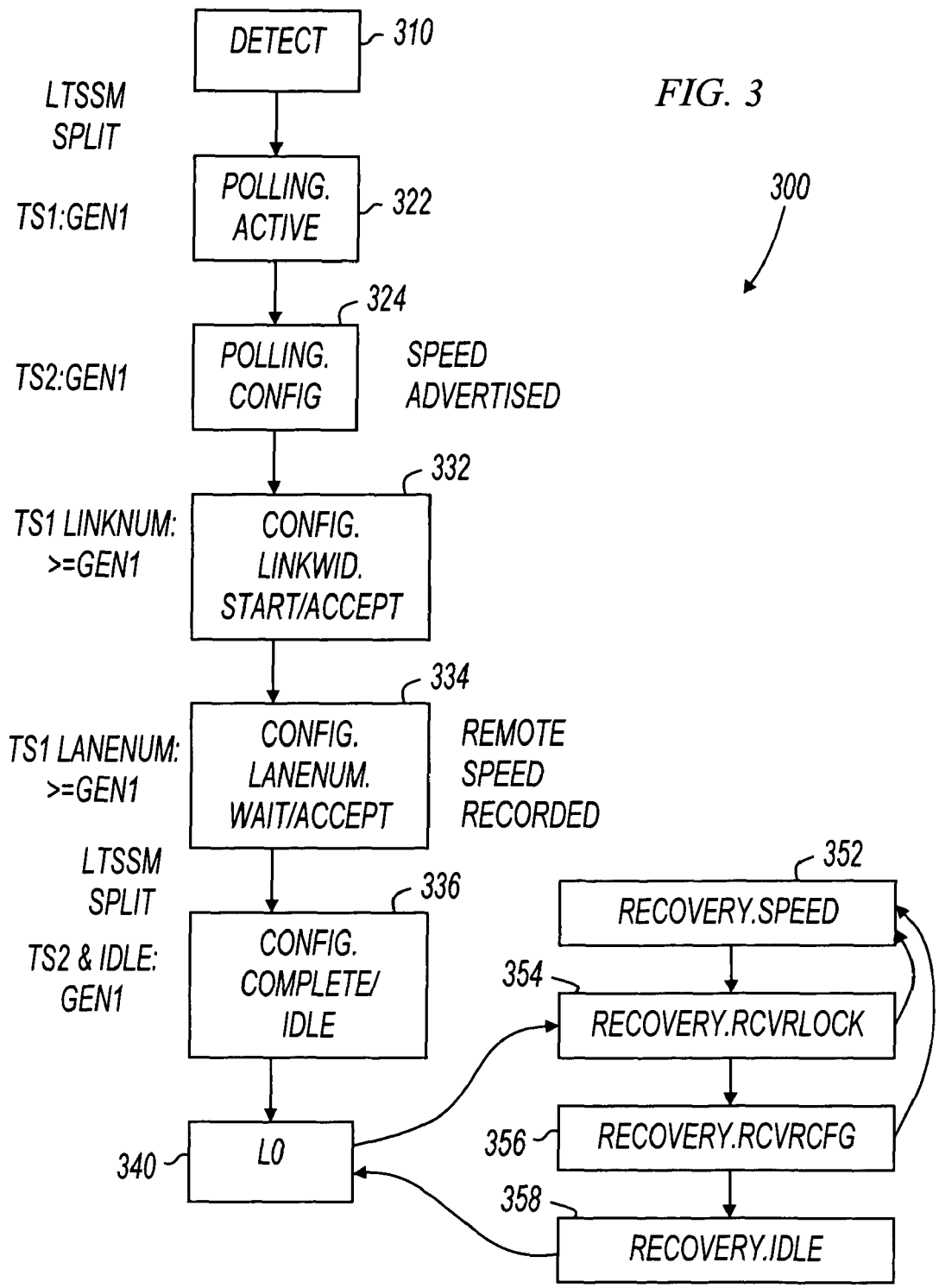

FIG. 3 shows a state machine diagram describing the operation of a link training and status state machine (LTSSM). The LTSSM of FIG. 3 is described in the context of a PCI Express system, but this is not a limitation of the present invention. As described above, the various embodiments of the present invention may be utilized in any links-based system that includes point-to-point links.

State machine 300 includes a Detect state 310, a Polling state, a Configuration state, a L0 state 340, and a Recovery state. The Polling state includes a Polling.Active substate 322 and a Polling.Config substate 324; the Configuration state includes a Config.Linkwid substate 332, a Config.Lanenum substate 334, and a Config.Complete substate 336; and the Recovery state includes a Recovery.Speed substate 352, a Recovery.Rcvrlock substate 354, a Recovery.Rcvrcfg substate 356, and a Recovery.Idle substate 358. The possible states and substates are not limited to those shown. For example, detect state 310 may include multiple substates, and states shown with substates may be collapsed into a single state.

Links-based systems such as those based on PCI-Express go through an elaborate training process that includes multiple states before bringing the link up to an operational state. For example, the link training algorithm detects receivers on the lanes during the Detect state, and tries to achieve symbol lock through the exchange of training sequences during the Polling state, establishing the link width, lane number assignment on functional lanes followed by lane-to-lane deskew during the Configuration state, before going to the L0 operational state. During L0, transactions are exchanged. Link level errors that can not be handled through link level retry (such as a loss of symbol lock) are handled through the Recovery state which keeps the link up but tries to recover by re-establishing the symbol lock, determining which lanes are functional, and performing a lane to lane deskew on the functional lanes before entering L0.

One of the major challenges in a links-based link training protocol is the absence of any in-band mechanism to communicate the state or the configuration of the link. Since one of the major advantages of a links-based system is delivering high bandwidth with a low pincount, these systems put a lot of complexity in the link training protocol to determine the state of the link in the connected component as well as its configuration and capabilities. For example, an upstream device may have 16 PCI-E lanes that can be configured as a x16 link or two x8 links or four x4 links or a combination of one x8 and two x4 links. The upstream device goes through the link training process in order to figure out how many downstream devices it is connected to, their widths, the type of connection (lane reversed, polarity inverted), and the health of the individual lanes in both directions before proceeding to assign lane numbers and using the individual link(s). This is a complex process considering that the link training state machine has to account for various downstream devices that may be in different states of the link training process and individual lanes within a link may not be in sync given the lane to lane deskew as well as the possibility of a long series of transient errors that should be recovered from.

As shown in FIG. 3, an LTSSM can split and allow one or more secondary LTSSM(s) to take over the subset of lanes that will form an independent link. FIG. 3 shows two of the places where a link training state machine can split. One is during exit from the Detect state. If multiple devices are detected, some devices may be out of reset and others may still be in reset. That results in some lanes detecting a receiver and others not detecting a receiver. Those that detect a receiver will move forward under one (or more) LTSSM whereas the ones that did not detect a receiver will be left under the control of one (or multiple) separate LTSSM. The next split happens during the Configuration state where the identity of independent links is established.

During the Polling state, training sequence (TS) ordered sets are transmitted at Gen1 speed and the speed capabilities of the local device are advertised. In some embodiments, all TS ordered sets transmitted between Polling and L0 include the speed capabilities (or "data rate identifiers").

In various embodiments of the invention as represented by FIG. 3, the link always comes up in Gen 1 (the slowest available) speed to the L0 state. While in the Configuration state and during the link training in Gen1 speed, and after the link width has been established and the lane numbers have been assigned, each device records the speed capability of the device it is connected to through the data rate identifier it received during the time when it establishes the lane to lane deskew. It should be noted that since the data rate identifier is recorded after the lane numbers have been assigned, there is only one connected device that the LTSSM is dealing with since the LTSSM split during the Configuration state happens after the lane number assignment. Thus, changing speed does not involve the complexity of splitting the LTSSM. Once the link is in L0, it can initiate the speed change through either software or hardware by taking the L0 to Recovery back to L0 transition route.

The Recovery.Speed substate is a state where the change to a new link speed is performed. The software mechanism to change the speed can be invoked by writing the desired speed to a configuration register. The hardware mechanism can be invoked by a higher layer of protocol such as initially to change to a higher speed or in response to events such as errors or power management where changing the speed may be desirable.

In various embodiments of the present invention, the speed change in the link is allowed to be initiated only in L0 state optionally after the initial flow-control operations have completed. When the initiator decides to change the speed, it enters the Recovery state (Recovery.RcvrLock substate) and sends the training sequence that is sent during Recovery. If the intent is to change speed, the initiator sets a bit in the training sequence that indicates its desire to change the speed and advertises only those speeds up to and including the speed it wants to operate on. Upon receipt of a minimum number of such training sequences from the initiator with the speed change indicator set, the recipient also sets the same speed change bit in a minimum number of training sequences before entering Recovery.Speed. The initiator receives the indication of speed change and enters Recovery.Speed. Both sides will choose the maximum speed that has been advertised by both sides in the training sequences they exchanged with the speed change bit set. Both sides will be in electrical idle in Recovery.Speed while they change to the new speed before reentering Recovery.RcvrLock with the new speed.

If either side fails to operate at the new speed, the side that fails to receive in the new speed will exit to Recovery.Speed and pull the other side to Recovery.Speed from Recovery.RcvrCfg. During the second entry to Recovery.Speed, the speed is reverted back to the L0 speed and the normal recovery action will ensure that the link goes back to the original speed. This may occur when a receiver fails to achieve the symbol lock during Recovery.RcvrLock even after waiting for the timeout period. Then the LTSSM on the side that failed to achieve symbol lock will enter Recovery.Speed where it will revert back to the old speed. The other side may be in Recovery.RcvrCfg but will go back to Recovery.Speed after seeing electrical idle if it is operating at a speed different than the L0 speed.

Since the link first comes up to L0 in Gen 1 speed, speed does not further complicate an already complex link training protocol. Further, by always coming up in the slowest available speed, the LTSSM of FIG. 3 provides interoperability with existing older generation devices since the lanes to the older generation device will not be driven at a higher speed than what the older device can handle. Also the link training time can be kept low by not negotiating link speed prior to L0.

The various embodiments of the present invention allow the link speed to be changed during normal operation. One can choose to change the link speeds dynamically depending on the runtime bandwidth demands of the link for better power management. For example, if a link is operating in Gen 2 speed, one can choose to downgrade it to Gen 1 speed to save power if the bandwidth demands are temporarily low. This can be done dynamically without taking the link down which would otherwise involve software intervention to reconfigure the entire hierarchy underneath the link.

Changing the link speed can be used for better reliability and availability. For example, if a link becomes marginal over time operating at a particular frequency, the link speed can be changed and the error rate monitored before deciding to change the frequency again, if applicable. Accordingly, link speed is a variable that can be modified in order to get to the desired level of reliability and availability since the link stays up during the speed change process.

Figure 4:
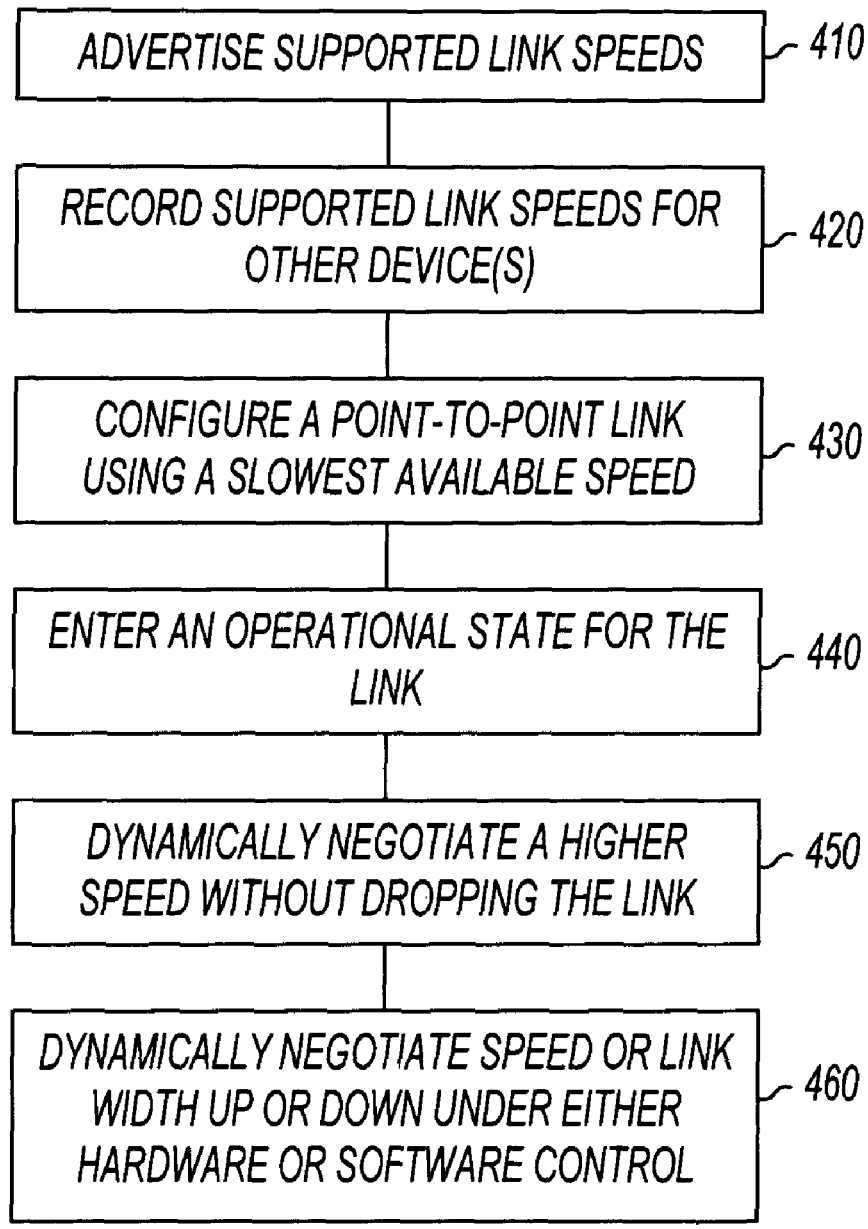
FIG. 4 shows a flowchart in accordance with various embodiments of the present invention.

FIG. 4 shows a flowchart in accordance with various embodiments of the present invention. In some embodiments, method 400 may be used by a link state machine in a device that communicates with point-to-point links. In some embodiments, method 400, or portions thereof, is performed by an integrated circuit, a processor, or an electronic system, embodiments of which are shown in the various figures. Method 400 is not limited by the particular type of apparatus, software element, or system performing the method. The various actions in method 400 may be performed in the order presented, or may be performed in a different order. Further, in some embodiments, some actions listed in FIG. 4 are omitted from method 400.

Method 400 is shown beginning at block 410 in which a device advertises supported link speeds. In the context of a PCI Express system, the link speeds may correspond to generation numbers (e.g., Gen 1, Gen 2, etc.). In other contexts, the link speeds may correspond to numerical data rates. The supported link speeds may be advertised to other devices during a link training sequence. For example, the link speeds may be advertised during a configuration state such as state 220 (FIG. 2) or states 332, 334, and 336 (FIG. 3), during a polling state such as states 322 or 324 (FIG. 3), or other state.

At 420, link speeds supported by other devices are recorded. The link speeds may be recorded in configuration state such as state 220 (FIG. 2) or states 332, 334, and 336 (FIG. 3). In some embodiments, by the time the link speeds are recorded, they have been received in many TS ordered sets. Further, in some embodiments, the link speeds are not recorded until they are received in a minimum number of TS ordered sets. At 430, a point-to-point link is established using a slowest available speed. In the context of a PCI Express system, the point-to-point link is always established first at Gen 1 speed. In the context of other systems, the point-to-point link is always established at the slowest speed compatible with both devices.

At 440, an operational state is entered for the link. In the context of a PCI Express system, the operational state is L0. In other system contexts, the operational state is any state that allows transactions to be performed across the link. In some embodiments, by the time the operational state has been reached, multiple state machines may be involved with multiple links because of state machine splits. Each of the state machines first brings its respective link into the operational state at the lowest available speed.

At 450, a higher speed is dynamically negotiated without dropping the link. In some embodiments, this corresponds to a state machine in a PCI compliant device (an "initiator") entering a recovery state normally associated with recovery from link errors. For example, as shown in FIG. 3, the Recovery state may be entered to dynamically negotiate a higher link speed without dropping the link.

In some embodiments, block 450 is performed without software intervention. For example, if during the link training sequence, both devices advertise a supported link speed higher than the lowest possible, then after entering the operational state at the lowest available speed, both devices may automatically enter a recovery state to negotiate a higher speed. In other embodiments, block 450 may be performed as a result of software intervention. For example, software may write to a configuration register that causes the state machine to attempt to negotiate a higher link speed.

At 460, link speed or link width may be dynamically negotiated up or down under either hardware or software control. Link speed or width or both may be negotiated down to reduce power or to increase reliability, and link speed or width or both may be negotiated up to increase communications bandwidth.

Figure 5:
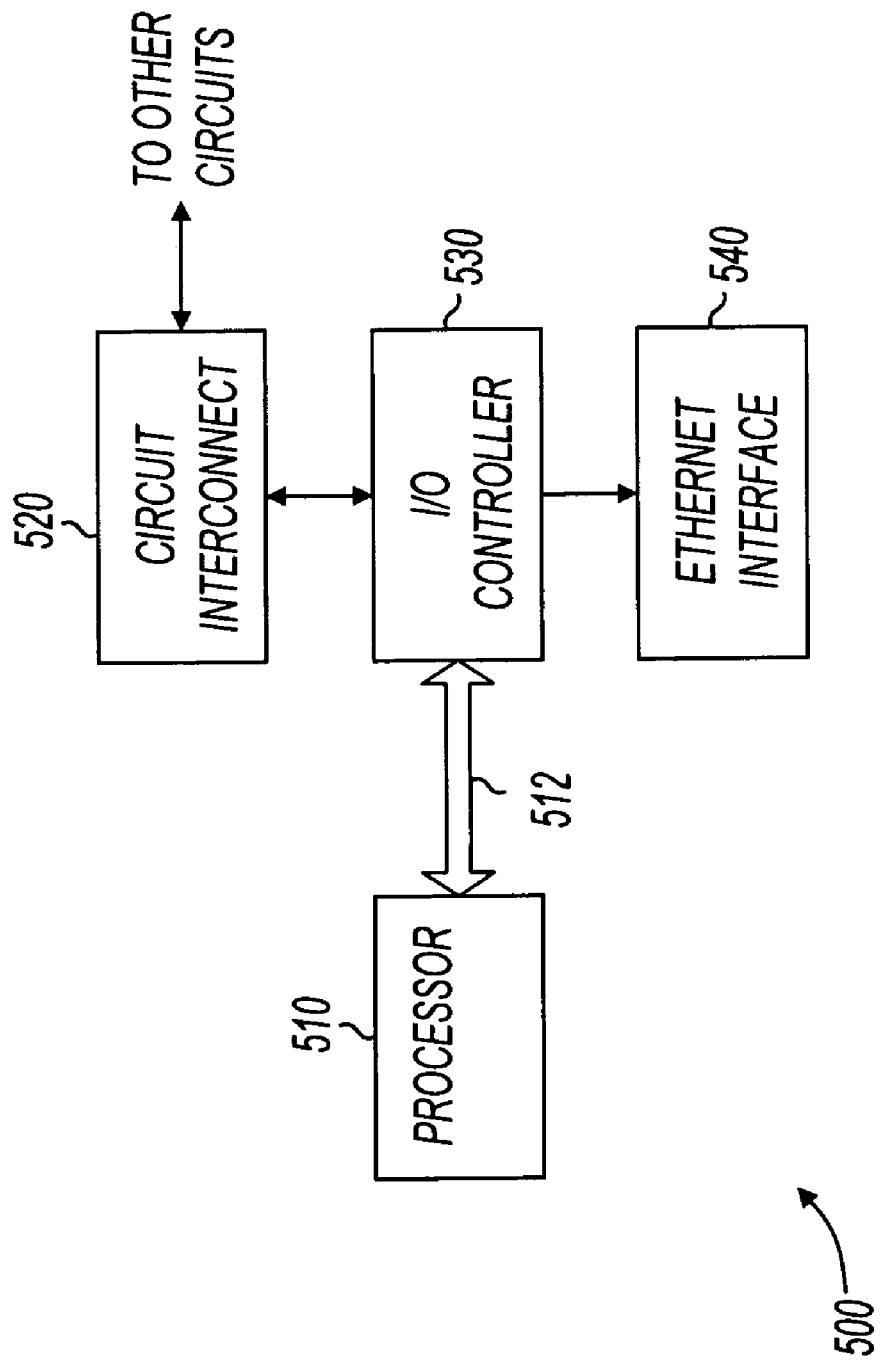
FIG. 5 shows a system diagram in accordance with various embodiments of the present invention.

FIG. 5 shows a system diagram in accordance with various embodiments of the present invention. Electronic system 500 includes processor 510, input/output (I/O) controller 530, circuit interconnect 520, and Ethernet interface 540. In some embodiments, electronic system 500 may be a computer having point-to-point links. In some embodiments, electronic system 500 may represent a system that includes devices that communicate with point-to-point links and that also includes an Ethernet interface. Examples include an access point or mobile station in a wireless network, a computer, or a digital camera having an Ethernet interface.

Processor 510 represents any type of processor, including but not limited to, a microprocessor, a digital signal processor, a microcontroller, or the like. In some embodiments, processor 510 communicates with I/O controller 530 using a point-to-point link 512. For example, in some embodiments, link 512 may be a link with dynamic speed negotiation capabilities as described above.

Ethernet interface 540 may provide communications between electronic system 500 and other systems. For example, in some embodiments, electronic system 500 may be an access point that utilizes Ethernet interface 540 to communicate with a wired network or to communicate with other access points. Some embodiments of the present invention do not include Ethernet interface 540. For example, in some embodiments, electronic system 500 may be a network interface card (NIC) that communicates with a computer or network using a bus or other type of port.

I/O controller 530 provides communications between the various other blocks in electronic system 500 using point-to-point links. For example, in a PCI Express context, I/O controller 530 may be a root complex (RC). Circuit interconnect 520 represents any type of interconnect useful to couple a separate circuit to I/O controller 530 using point-to-point links. In some embodiments, circuit interconnect 520 includes traces on a circuit board, and in other embodiments, circuit interconnect 520 includes cabling or wiring. In still further embodiments, circuit interconnect 520 includes an integrated circuit footprint on a circuit board, or one or more slots capable of accepting a circuit card. Circuit interconnect 520 may accept any type of circuit capable of communicating with I/O controller 530 using point-to-point links. For example, a circuit coupled to circuit interconnect 520 may operate as an Endpoint in a PCI Express compatible system. Example Endpoints include, but are not limited to, a PCI Express attached graphics controller or a PCI Express USB host controller.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    configuring a point-to-point communications link between two peripheral component interconnect (PCI) devices using a slowest available link speed;
    entering an operational state (L0) at the slowest available link speed;
    entering, for the purpose of negotiating a faster link speed, a Recovery state normally associated with recovery from link errors;
    sending training sequences from within the Recovery state, the training sequences normally associated with recovery from link errors, the training sequences including indications of a desired speed change;
    receiving second training sequences while in the Recovery state, the second training sequences also including speed change indications;
    entering a Recovery substate (Recovery.Speed) to select a new link speed without dropping the link; and
    entering the operational state at the new link speed.

2. The method of claim 1 wherein entering a Recovery state normally associated with recovery from link errors is initiated by software.

3. The method of claim 1 wherein entering a Recovery state normally associated with recovery from link errors is initiated by hardware.

4. The method of claim 1 further comprising dynamically negotiating a different link width.

5. The method of claim 1 further comprising dynamically negotiating a slower link speed to reduce power consumption.

6. A peripheral component interconnect (PCI) Express compliant device comprising:
    a state machine to configure a point-to-point link with a second device, wherein the state machine includes a first state to advertise speed capabilities of the device, a second state to record speed capabilities of the second device, a third state to configure the point-to-point link to operate at a slowest available speed, and a fourth state to transmit a training sequence to recover from link errors, wherein the training sequence includes speed change indications, and the fourth state includes a substate (Recovery.Speed) to negotiate a different link speed without dropping the link.

7. The device of claim 6 wherein the fourth state is capable of dynamically negotiating link speeds up or down in response to current link performance.

8. The device of claim 6 wherein the fourth state is capable of dynamically negotiating link speeds up or down in response to commands under software control.

9. The device of claim 6 wherein the fourth state is capable of dynamically negotiating a link width up or down in response to commands under software control.

10. An integrated circuit having a plurality of interconnects to form point-to-point links with at least one other integrated circuit, the integrated circuit including a state machine with at least one state to configure individual links, and at least one state to recover from link errors by transmitting a training sequence without resetting the integrated circuit, wherein the at least one state to recover from link errors transmits training sequences with speed change indications, and includes a sub-state (Recovery.Speed) to effect a link speed negotiation capability, and wherein the state machine can enter the at least one state to recover from link errors as a result of a link error or to negotiate a link speed change without a link error.

11. The integrated circuit of claim 10 wherein the link speed negotiation capability can be invoked under software control.

12. The integrated circuit of claim 10 wherein the at least one state to recover from link errors further includes a link width negotiation capability to modify how many of the plurality of interconnects are used to communicate with another integrated circuit.

13. The integrated circuit of claim 12 wherein the link width negotiation capability can be invoked under software control.

14. The integrated circuit of claim 10 wherein the integrated circuit is at least partially compliant with a peripheral component interconnect (PCI) specification.

15. An electronic system comprising:
   a processor;
   a circuit interconnect to communicate with a circuit capable of supporting point-to-point links; and
   an input/output (I/O) controller coupled to the processor and to the circuit interconnect, the I/O controller including a state machine to configure a point-to-point link with a separate circuit coupled to the circuit interconnect, wherein the state machine includes a first state to advertise speed capabilities of the I/O controller, a second state to record speed capabilities of the separate circuit, and a third state to configure the point-to-point link to operate at a slowest available speed, and a fourth state to transmit a training sequence to recover from link errors, wherein the training sequence includes a speed change indication, and the fourth state includes a sub-state (Recovery.Speed) to negotiate a different link speed without dropping the link.

16. The electronic system of claim 15 wherein the point-to-point link is at least partially compliant with a peripheral component interconnect (PCI) standard.

17. A method comprising:
   configuring a point-to-point communications link between two peripheral component interconnect (PCI) devices using a slowest available link speed;
   entering an operational state at the slowest available link speed;
   entering a Recovery state capable of recovery from link errors and capable of negotiating link speed changes without dropping the link;
   sending training sequences from within the Recovery state to negotiate a desired speed change without dropping the link, the training sequences being the same training sequences used to recover from link errors from within the Recovery state when link errors occur
   receiving second training sequences while in the Recovery state, the second training sequences including speed change indications;
   entering a Recovery substate and selecting a new link speed; and
   entering the operational state at the new link speed.

18. The method of claim 17 further comprising dynamically negotiating a different link width from within the Recovery state.

* * * * *